Oct. 25, 1949.  W. R. KEMPT  2,486,293
SHOCKPROOF DIAL INDICATOR
Filed June 29, 1945

INVENTOR.
WILLIAM R. KEMPT
BY
Charles O Bruce
ATTORNEY

Patented Oct. 25, 1949

2,486,293

UNITED STATES PATENT OFFICE 2,486,293

SHOCKPROOF DIAL INDICATOR

William R. Kempt, Oakland, Calif.

Application June 29, 1945, Serial No. 602,370

2 Claims. (Cl. 33—172)

My invention relates to indicators, and more particularly to indicators wherein movement of an indicating needle around the face of a dial is responsive to linear movement of a stem associated therewith and against which, external pressure may be applied.

One such type of indicator has a spring biased stem, associated with the indicating needle shaft by a tensioned thread which makes a number of turns about the shaft, and thereby causes rotation thereof in response to linear movement of the stem. One of the difficulties encountered with such a meter is breakage of the thread, and I have found that this is most apt to happen when the stem is rapidly accelerated, as may occur in accidental dropping of the indicator.

One of the objects of my invention is to provide a novel and improved indicator of the type described, wherein rapid acceleration of the stem will not permit tensioning of the thread to the breaking point.

Additional objects of my invention will be pointed out in the following description of a preferred embodiment of the same, taken in conjunction with the accompanying drawing wherein—

Figure 1:
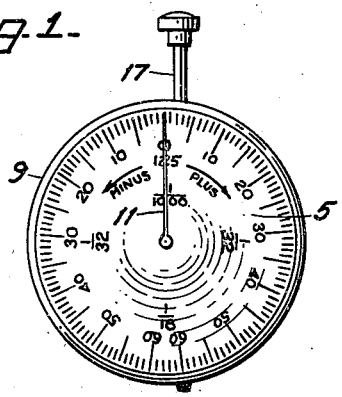
Figure 1 is a front elevational view of an indicator of the type to which my invention is pertinent.
Figure 2:
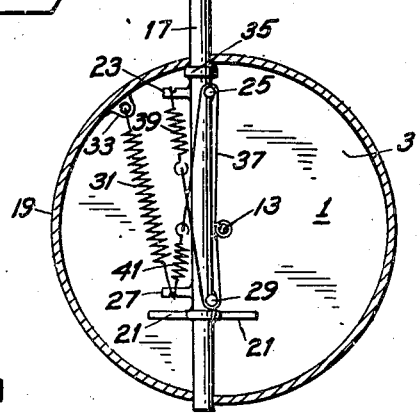
Figure 2 is a view in section in the plane 2—2 of Figure 3 showing the interior of an indicator embodying my invention.
Figure 3:
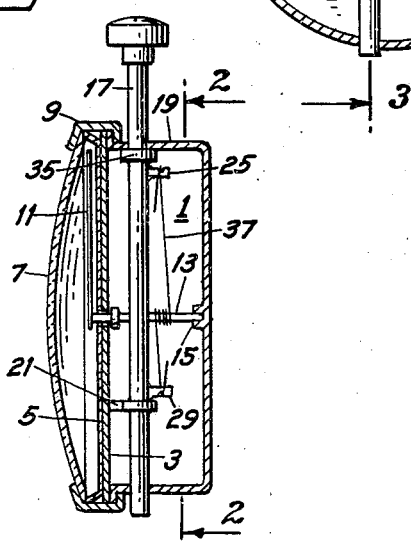
Figure 3 is a view in section, taken in the plane 3—3 of Figure 2.

The indicator includes a casing which may be of any design, though for purposes of illustration, I have shown a casing 1 cylindrical in form, having a front plate 3 faced with a dial 5 and a covering lens 7, all held in assembly by a bezel 9.

An indicating needle 11 is mounted in front of the dial on one end of a shaft 13 which passes axially through the casing and is supported by the front plate 3 at the needle end, and at its other end, the shaft is journaled in a bearing 15 on the rear wall of the casing.

A stem 17 slidably passes through the cylindrical wall 19 of the casing at right angles to the needle shaft and adjacent thereto. A pair of guide legs 21 mounted on the stem and slidably contacting the rear surface of the front plate, preclude turning of the stem, and limit its permissible movement to a linear movement.

The stem is provided with a pair of posts 23 and 25 in the upper portion of the indicator, and a similar pair 27 and 29 toward the lower end, the posts 25 and 29 extending substantially parallel to the needle shaft.

A coil spring 31 extends between the lower post 27 and an eyelet 33 on the wall of the casing, and serves to normally bias the stem to its maximum upward position, as determined by a stop collar 35 on the stem, which abuts against the wall of the casing when such maximum upward position is reached.

Linear movement of the stem is translated into rotational movement of the needle shaft, by a thread 37, preferably of nylon, which makes a plurality of turns about the needle shaft, with each end of the thread passing over one of the aforementioned parallel posts 25, 29, and being anchored to the remote anchoring post 27, 23, respectively, through the medium of a small coil spring 39 and 41, respectively.

An indicator of the type described is adapted for use by machinists in determining tolerances, etc. When thus employed, it is clamped with the stem against the work surface under sufficient pressure to swing the needle through a complete circle, more or less, to bring the needle in registry with the zero indication on the dial. After such adjustment, the indicator is in condition to register both plus and minus deviations from a desired zero reading.

The anchoring springs 39 and 41 not only function to maintain tension in the thread 37, but I have found that rapid acceleration of the stem, which might under previous conditions have ruptured the thread, no longer causes such damage.

A single spring, while it may serve to tension the thread, will not preclude breakage thereof under the conditions noted. This I attribute to the probability that the static inertia of the needle and shaft, light though the elements are, is still so great, under the conditions of acceleration considered, as to cause tensioning of the solidly anchored end portion of the thread to the breaking point before such inertia can be overcome.

While I have disclosed my invention in its preferred form, the same is subject to modification and variation without departing from the underlying principles thereof, and I accordingly do not desire to be limited in my protection to the specific details disclosed and described, except as may be necessitated by the appended claims.

I claim:

1. An indicator comprising a casing, a needle shaft supported substantially axially of said casing, a stem slidably mounted in said casing substantially at right angles to said shaft and adjacent thereto, said stem having a pair of posts toward the upper end of said casing, and a pair of posts toward the lower end, a thread encircling said shaft and having one end extending over one post of the upper pair and the other end over a post of the lower pair, and means resiliently anchoring each end of said thread to the remaining post of the other pair 2. An indicator comprising a casing, a needle shaft supported substantially axially of said casing, a stem slidably mounted in said casing substantially at right angles to said shaft and adjacent thereto, said stem having a pair of posts toward the upper end of said casing, and a pair of posts toward the lower end, a thread encircling said shaft and having one end extending over one post of the upper pair and the other end over a post of the lower pair, and a spring affixed at each end of said thread and anchored to the remaining post of the other pair.

WILLIAM R. KEMPT.

REFERENCES CITED

The following references are of record in the file of this patent:

UNITED STATES PATENTS

| Number | Name | Date |
| --- | --- | --- |
| 1,160,630 | MacKinnon | Nov. 16, 1915 |
| 1,664,833 | Schaper | Apr. 3, 1928 |
| 1,726,129 | Steinle | Aug. 27, 1929 |